Patented Oct. 28, 1947

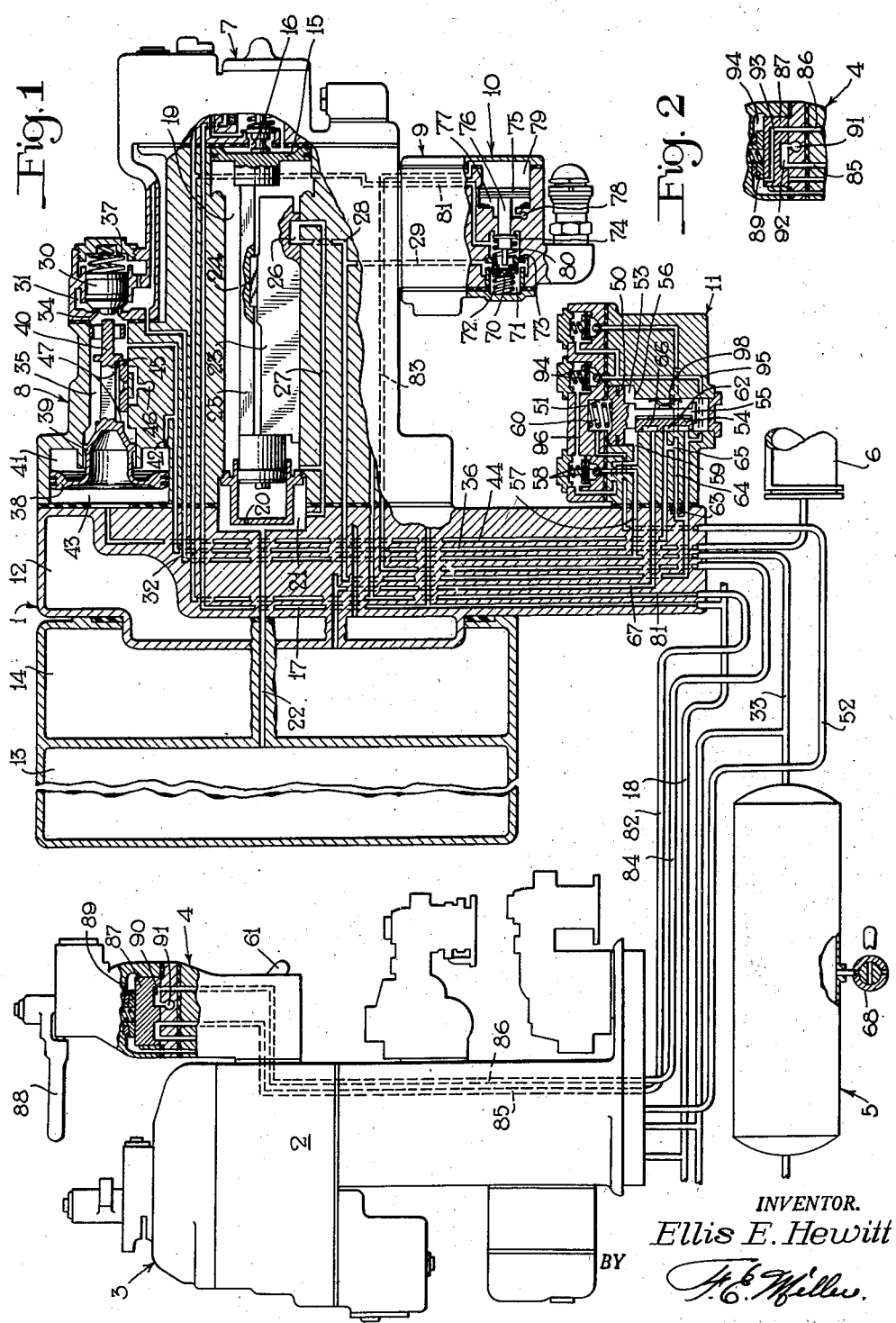

2,429,687

UNITED STATES PATENT OFFICE 2,429,687

FLUID PRESSURE BRAKE

Ellis E. Hewitt, Edgewood, Pa., assignor to The Westinghouse Air Brake Company, Wilmerding, Pa., a corporation of Pennsylvania Application May 14, 1946, Serial No. 669,605

7 Claims. (Cl. 303—40)

This invention relates to fluid pressure brakes and more particularly to locomotive brake equipment of the general type shown in my U. S. Patents Nos. 2,009,841 and 2,130,620 issued, respectively, on July 30, 1935, and September 20, 1938.

The brake equipments shown in the above identified patents comprise a distributing valve device having an application portion which is operative by fluid under pressure to effect an application of the locomotive brakes and upon release of such fluid under pressure to effect a release of said brakes. The distributing valve device also has an equalizing portion subject to opposing pressures of fluid in a brake pipe and in a pressure chamber and operative upon a reduction in brake pipe pressure to supply fluid under pressure from said pressure chamber to the application portion to cause operation thereof to apply the brakes and operative upon restoration of brake pipe pressure to release fluid under pressure from the application portion for releasing the locomotive brakes.

The brake equipment shown in the above mentioned patents also includes a delay valve device comprising a two position slide valve which controls the fluid pressure supply communication between the equalizing portion and the application portion.

In one position of the delay slide valve, employed in long train operation, this communication is restricted in order to retard the application of locomotive brakes for preventing harsh gathering of train slack, while in the other position, employed in short train operation where slack action is not a problem, the communication provides for a faster rate of flow of fluid under pressure to the application portion of the distributing valve device in order to obtain more prompt application of the locomotive brakes. A piston is connected to the slide valve for moving it to its different positions. At the valve side of the piston is a valve chamber charged with fluid under pressure from the usual main reservoir on the locomotive, while at the opposite side of the piston is a control chamber adapted to be either open to atmosphere or to the main reservoir. When the control chamber is open to the main reservoir and thus charged with fluid under pressure therefrom a spring acting on the piston moves said piston and the slide valve to the position for long train operation, while when the control chamber is open to atmosphere main reservoir pressure in the valve chamber actuates the piston to move the slide valve to the position for short train operation.

The main reservoir pressure in the valve chamber of the delay valve device also acts to hold the slide valve seated against pressure of fluid provided in the above mentioned fluid pressure supply communication between the equalizing and application portions of the distributing valve device. It will therefore be seen that if the fluid under pressure is drained from the main reservoir and from the delay valve chamber at a time when the locomotive brakes are applied, the pressure of fluid in the above mentioned communication acting against the seating face of the slide valve will tend to blow it off of its seat in which case it might not be able to subsequently reseat, particularly if foreign matter got between it and its seat. Then if the main reservoir were recharged with fluid under pressure, the fluid from the main reservoir entering the delay valve chamber would leak or flow past the delay valve to the communication leading to the application portion of the distributing valve device and cause operation thereof to effect an application of the locomotive brakes, resulting in what commonly is known as stuck brakes, since the brakes could not be released except by again draining the main reservoir, as would be required to permit removal of the delay valve device for repair or replacement.

The undesired operation just described may occur in draining the fluid under pressure from the main reservoir and other parts of the brake system preparatory to removing for repair a portion of the distributing valve device or possibly some other part of the brake system, it being understood that when the locomotive is idle with the main reservoir charged the locomotive brakes are usually applied.

This undesired operation may however be completely avoided by proper manipulation of the equipment. For instance, before draining the main reservoir the automatic portion of the engineer's brake valve device, disclosed in the above referred to patents, may be moved to emergency position to cause the distributing valve device to operate to effect an emergency application of the brakes, and in this position a restricted flow of fluid under pressure is provided from the automatic portion of the engineer's brake valve device to the communication above mentioned for maintaining the pressure in the application portion against leakage. After the brakes are applied in emergency, the automatic portion of the engineer's brake valve device may then be returned to service position for cutting off the restricted supply of fluid under pressure to the application portion of the distributing valve device.

Then the independent portion of the engineer's brake valve device, also disclosed in the above referred to patents, may be operated to effect a release of the actuating fluid under pressure from the application portion of the distributing valve device and thus remove the pressure from the communication through the delay slide valve, so that the main reservoir may then be drained without danger of said slide valve being blown off its seat.

The principal object of the invention, however, is the provision of an improved delay valve device so constructed as to insure that the slide valve therein will not be blown from its seat when the main reservoir is drained, even if the locomotive brakes are applied.

Other objects and advantages will become apparent from the following more detailed description of the invention.

In the accompanying drawing; Fig. 1 is a diagrammatic view, partly in section and partly in outline, of a locomotive brake equipment embodying the invention; and Fig. 2 is a sectional view of a portion of the independent portion of the engineer's brake valve device shown in Fig. 1, but with the rotary valve thereof in a different position.

Description

As shown in the drawings, the brake equipment comprises a distributing valve device 1, an engineer's brake valve device 2 comprising an automatic portion 3 and an independent portion 4, a main reservoir 5 and a brake cylinder device 6.

The distributing valve device 1 comprises an equalizing portion 7, an application portion 8, a reduction chamber cut-off valve device 9, a release valve device 10, a delay valve device 11, a reduction chamber 12, and a reservoir portion upon which all of the parts so far enumerated are removably mounted, said reservoir portion having a pressure chamber 13 and an application chamber 14.

The distributing valve device 1 and the other portions of the apparatus employed in the system shown in this application, with the exception of the invention which will hereinafter be particularly pointed out, are substantially the same in construction and operation as the corresponding apparatus disclosed in the aforementioned patents, and only such portions of the apparatus are disclosed in this application, and only the portions of the operation of the equipment are described, which are essential to the understanding of the improvement provided by this invention.

The equalizing portion of the distributing valve device comprises an equalizing piston 15 having at one side a chamber 16 open through a passage 17 to the usual brake pipe 18 which is connected to the brake valve device 2. At the opposite side of the equalizing piston 15 is a chamber 19 open through a port 20, a chamber 21 and a passage 22 to the pressure chamber 13. The valve chamber 19 contains a main slide valve 23 and a relatively movable auxiliary slide valve 24 mounted on the main slide valve, and a stem 25 connecting the piston 15 to said slide valves for moving same to their different positions in the usual manner.

Upon an emergency reduction in pressure in the brake pipe 18 and thereby in the equalizing piston chamber 16 the equalizing piston 15 will move to its emergency position, in which it is shown in the drawing, for correspondingly positioning the slide valves 23 and 24. In emergency position of the main slide valve 23 a cavity 26 therein establishes a communication between a passage 27 and a passage 28. The passage 27 is open to chamber 21, while passage 28 leads to the delay valve device 11. A passage 29 connects passage 28 to the release valve device 10. The pressure chamber 13 is normally charged with fluid under pressure, as is well known, so that when the equalizing piston 15 and slide valves 23 and 24 are in emergency position, as just described, fluid under pressure will be permitted to flow from said chamber through passage 22, chamber 21, passage 27, cavity 26 in the slide valve 23 and thence through passage 28 to the release valve device 10 and to the delay valve device 11.

The application portion 8 of the distributing valve device comprises an application valve 30 contained in a chamber 31 which is connected by a passage 32 to a main reservoir pipe 33, leading to main reservoir 5 which normally is charged with fluid under pressure in the conventional manner. The application valve 30 is arranged to cooperate with an annular seat 34 to close communication between chamber 31 and a valve chamber 35 which is connected by a passage and pipe 36 to the brake cylinder device 6. A spring 37 acts on the application valve 30 for urging it into contact with the seat 34. For opening the application valve 30 against spring 37 an application piston 38 is provided in the casing, said piston being connected thru a coaxially arranged baffle piston 39 of smaller diameter to a stem 40 extending through the valve chamber 35 in coaxial relation to the opening through the application valve seat 34, and to the application valve 30. One side of the baffle piston 39 is subject to pressure of fluid in chamber 35 while between the opposite side of said piston and the application piston 38 is a stabilizing chamber 41 which is open through a restricted passage 42 to the brake cylinder passage 36. At the opposite side of the application piston 38 is a chamber 43, commonly called an application cylinder, which is connected by a passage 44 to the delay valve device 11.

An exhaust slide valve 45 contained in valve chamber 35 is arranged to control communication between said chamber and an atmospheric exhaust port 46, said slide valve being loosely disposed between space shoulders 47 on the application piston stem 40 for operation thereby.

When fluid under pressure is supplied to the application piston chamber 43 by way of passage 44, the piston 38 will be moved in the direction of the right hand to shift the slide valve 45 to the position in which it is shown in the drawing for closing communication between chamber 35 and the exhaust port 46, following which the piston stem 40 will engage and then unseat the application valve 30. Fluid under pressure supplied to the application valve chamber 31 from the main reservoir 5 will then flow to valve chamber 35 and thence through passage 36 to the brake cylinder device 6 for applying the locomotive brakes. As fluid under pressure thus flows to the brake cylinder device through passage 36 fluid will also flow from said passage through choke 42 to chamber 41 between the application piston 38 and the baffle piston 39. When the pressure of fluid thus obtained in chamber 41 and acting on the piston 38, plus the pressure of fluid in valve chamber 35 acting on piston 39 becomes increased to a degree slightly exceeding that acting in chamber 43 on piston 38, said piston will be shifted toward the left hand relative to the slide valve 45 and to substantially the lap position in which it is shown in the drawing, to permit closure of the application valve 30 by spring 37 for preventing further flow of fluid under pressure from the main reservoir 5 to the brake cylinder device 6. The pressure of fluid obtained in the brake cylinder device 6 will thus be limited to substantially the same degree as acting in chamber 43 on the application piston 38.

The delay valve device 11 comprises a casing containing a piston 50 having at one side a control chamber 51 open to a control pipe 52 and having at the opposite side a valve chamber 53 containing a slide valve 54 which is connected for movement with the piston 50 by a stem 55. The valve chamber 53 also contains a conventional leaf spring 98 acting on the slide valve 54 for holding it seated during shipment of the device or when the device is void of fluid under pressure.

The delay piston 50 and slide valve 54 have two different positions, namely, a position for short train operation in which the parts are shown in the drawing, and a position for long train operation in which the piston 50 will be in contact with a shoulder 56 in the casing.

The valve chamber 53 is normally charged with fluid under pressure from the main reservoir 5 through pipe 33, passage 32, a passage 57, past two serially arranged check valves 58, constituting a part of the invention, and thence through a passage 59, this pressure being effective to hold the slide valve 54 against its seat and being also effective on one side of the piston 50 for moving said piston and slide valve 54 to the short train position shown in the drawing upon release of fluid under pressure from chamber 51 through the pipe 52. When fluid under pressure is supplied to chamber 51 through pipe 52 at a pressure equal substantially to that in valve chamber 53 a spring 60 in said chamber acting on piston 50 will move said piston and slide valve 54 to the position for long train operation as defined by contact between said piston and the shoulder 56.

An engineer's selector device 61 associated with the brake valve device 2 is operative to open pipe 52 either to atmosphere or to main reservoir 5, by way of communications not shown in the drawing and not pertinent to the invention, for controlling the positioning of the delay valve piston 50 and slide valve 54.

Passage 28 from the equalizing portion 7 of the distributing valve device leads to the seat of the delay slide valve 54 as also does passage 44 from the application piston chamber 43. The delay slide valve 54 has a cavity 62 which, in the short train position of the delay valve device, establishes communication between the passages 28 and 44 so that with the equalizing portion 7 of the distributing valve device in its emergency position fluid under pressure will be permitted to flow from the pressure chamber 13 through said cavity to the application piston chamber 43 for operating the application portion 8 of the distributing valve device to effect an emergency application of the locomotive brakes. In the long train position of the delay slide valve 54 the cavity 62 will be moved out of registry with passage 44, and when an emergency application of the locomotive brakes is effected under this condition fluid supplied to passage 28 from the pressure chamber 13 by operation of the equalizing portion 7 of the distributing valve device will flow from said passage through a choke 63 to a passage 64 and thence through a passage 65 to passage 44 leading to the application piston chamber 43, whereby the rate of application of the locomotive brakes will be retarded by said choke. Also, in the long train position of slide valve 54 a cavity 66 therein connects passage 44 to passage 67, so that at the same time as fluid flows to the application piston chamber 43 it will also flow to the application chamber 14, which is normally at atmospheric pressure, to further delay the rate of brake application on the locomotive, for reasons before mentioned.

It will now be seen that when the locomotive brakes are applied the pressure of fluid from pressure chamber 13 and from the application piston chamber 43 is effective under the delay slide valve 62, but unseating of said slide valve is normally prevented by such pressure by the pressure of fluid from the main reservoir 5 in valve chamber 53. It will also be seen that if the check valves 58 constituting a part of the present invention, were not employed, and fluid under pressure was drained from the main reservoir 5, by operation of a drain valve device 68, fluid under pressure would at the same time be drained from the delay valve chamber 53 which would permit the pressure of fluid acting on the seating face of the delay slide valve 54 to blow said slide valve off of its seat. If subsequently the delay slide valve 54 did not go back into sealing contact with its seat under the pressure of spring 98 and the main reservoir 5 and thereby the delay valve chamber 53 were recharged with fluid under pressure, such pressure would leak past said slide valve to passage 44 and thereby into the application piston cylinder 43 and effect operation of the application portion 8 of the distributing valve device to apply the locomotive brakes, resulting in stuck brakes which would prevent movement of the locomotive, as will be apparent.

Blowing of the delay slide valve 54 from its seat under a condition such as just described may be prevented by suitable operation of the engineer's independent brake valve device 4 and the release valve device 10, as will now be described.

The release valve device 10 comprises a check valve 70 contained in a chamber 71 to which is connected passage 28 by way of passage 29. A spring 72 in chamber 71 acts on the check valve 70 for urging it into contact with a seat 73 for normally preventing loss of fluid under pressure from passage 28 past said check valve to a chamber 74. The release valve device further comprises a piston 75 having a stem 76 extending thru a chamber 77 into chamber 74. Chamber 77 is open to atmosphere thru a vent port 78. At the opposite side of piston 75 is a control chamber 79. A spring 80 in chamber 74 acts on the piston stem 76 for urging in a direction away from check valve 70. Chamber 74 is open thru a passage 81 to an application pipe 82, and piston chamber 79 is connected thru a passage 83 to an independent release pipe 84. The pipes 82 and 84 lead to the engineer's brake valve device 2 which is provided with passages 85 and 86 connecting pipes 82 and 84 respectively to the independent portion 4 thereof.

The independent portion 4 of the engineer's brake valve device comprises a rotary valve 87 and an operator's control lever 88 connected to said valve through the medium of a key 89 for turning said valve to a plurality of different controlling positions including a normal running position, in which said valve and lever are shown in Fig. 1 of the drawing, and a brake release position in which said valve is shown in Fig. 2 of the drawing. In the normal running position of rotary valve 87 a cavity 90 therein connects passage 86 and thereby piston chamber 79 in the release valve device 10 to atmosphere by way of a port 91. With piston chamber 79 of the release valve device 10 thus open to atmosphere spring 80 acting on piston stem 76 will hold said stem out of contact with the check valve 70 to permit seating of said check valve by spring 72 so that when the equalizing portion 7 of the distributing valve device operates to effect an emergency application of brakes, as before described, fluid pressure supplied to passage 28 will not be vented through passage 29 and past said check valve.

Now if the locomotive brakes are applied and the engineer desires to drain the fluid under pressure from the main reservoir 5 and thereby from valve chamber 53 of the delay valve device 11, at the same time insuring that the delay slide valve 54 will not be blown from its seat, lever 88 of the independent portion of the engineer's brake valve device will be operated to turn the rotary valve 87 to the brake release position shown in Fig. 2 in which position passage 85 communicating with chamber 74 in the release valve device 10 will be connected to atmosphere through a cavity 92 in the rotary valve 87 and atmospheric vent port 91, while a port 93 in said rotary valve will establish communication between a chamber 94 above the rotary valve and passage 86. Chamber 94 is normally supplied with fluid under pressure for holding the rotary valve 87 seated, as well known, so fluid from said chamber will now flow through port 93 to passage 86 and thence to piston chamber 79 in the release valve device 10. The pressure of fluid thus provided on the release piston 75 will then move said piston in the direction of the left hand and this movement will unseat the check valve 70 from the seat 73 to connect passage 29 to passage 81 whereupon fluid under pressure from pressure chamber 13 and from the application piston chamber 43, as well as from the application chamber 14, if connected with said piston chamber, will be vented to atmosphere by way of passage 81, pipe 82, passage 85 in the engineer's brake valve device 2 and thence through cavity 92 in the rotary valve 87 and the atmospheric vent port 91. This release of fluid under pressure from the application piston chamber 43 and from pressure chamber 13 will remove pressure of fluid from beneath the delay slide valve 54 which will prevent said slide valve from being blown from its seat upon draining of fluid under pressure from the main reservoir 5 and from valve chamber 53 in the delay valve 11.

Operation of the independent portion 4 of the engineer's brake valve device for releasing fluid under pressure from the application piston chamber 43 and pressure chamber 13 to remove the pressure acting on the seating face of the delay slide valve 54 in order to prevent said slide valve being lifted from its seat upon draining of fluid under pressure from the main reservoir 5 is not essential however according to the present invention which will now be described.

The two check valves 58 interposed in the communication between the delay valve chamber 53 and passage 57 which is connected to the main reservoir constitute a part of the present invention as above mentioned, said check valves being operative to prevent release of fluid under pressure from the delay valve chamber 53 upon draining of fluid under pressure from the main reservoir 5, as will be apparent. I further provide in the delay valve device two serially arranged check valves 94 for controlling communication between a passage 95 which is connected to passage 28 and a passage 96 which is connected to passage 59, the communication including these check valves being adapted to permit flow of fluid under pressure from passage 28 and thereby from the pressure chamber 13 to the delay valve chamber 53 to maintain the pressure therein equal at least to that acting on the seating face of the delay slide valve 54 if, subsequent to draining of fluid under pressure from the main reservoir 5, the check valves 58 should leak and tend to permit fluid under pressure to be dissipated from chamber 53 to passage 57 connected to the drained main reservoir.

It will now be seen that the check valves 58 will normally bottle fluid under pressure in the delay valve chamber 53 upon draining of fluid under pressure from the main reservoir 5 to prevent the delay slide valve 54 from being blown from its seat by pressure of fluid acting on the seating face thereof, but in case said check valves leak, which would result in reducing the pressure of fluid in valve chamber 53, fluid under pressure will flow from passage 28 past check valves 94 to said chamber to maintain the pressure therein equal at least to the pressure in passages 28 and 44 acting on the seating face of the slide valve 54, and since the area of the slide valve normally subject to pressure of fluid from said passages is much less than the area subject to pressure of fluid in valve chamber 53, maintenance of the slide valve 54 against its seat is positively insured. Moreover the usual leaf spring 98 acting on the delay slide valve will positively hold said valve seated even if the force tending to unseat said valve should become equal to that incident to pressure of fluid in the valve chamber 55 tending to hold it seated.

It will now be seen that the delay slide valve 54 will not be blown from its seat by brake applying pressure acting on the seating face thereof if the main reservoir 5 is drained of fluid under pressure at a time when the brakes on the locomotive are applied, since the pressure of fluid in the delay valve chamber 55 will be maintained at a sufficiently high degree to prevent such from occurring, either by the check valves 58 holding fluid in said chamber previously supplied from the main reservoir, or in case of leakage past said check valves, the pressure of fluid in said chamber will be maintained by flow from pressure chamber 13 past the check valves 94.

Having now described the invention what I claim as new and desire to secure by Letters Patent is:

1. In a fluid pressure brake, in combination, valve means operable to establish a communication for supplying fluid under pressure to effect an application of brakes, a valve device comprising a casing having a chamber, a valve seat in said casing, a slide valve in said chamber mounted on said seat, said communication opening to said seat and traversing said slide valve whereby said slide valve is adapted to be subjected on its seating face to pressure of fluid in said communication, conduit means connected to said chamber for conveying fluid under pressure thereto to act on said slide valve to press it against its seat, and check valve means in said conduit means for preventing flow of fluid under pressure therethrough from said chamber.

2. In a fluid pressure brake, in combination, valve means operable to establish a communication for supplying fluid under pressure to effect an application of brakes, a valve device comprising a casing having a chamber, a valve seat in said casing, a slide valve in said chamber mounted on said seat, said communication opening to said seat and traversing said slide valve whereby said slide valve is adapted to be subjected on its seating face to pressure of fluid in said communication, conduit means connected to said chamber for conveying fluid under pressure thereto to act on said slide valve to press it against its seat, check valve means in said conduit means for preventing flow of fluid under pressure therethrough from said chamber, other conduit means connected to said chamber for also conveying fluid under pressure thereto, and check valve means in said other conduit means for preventing reverse flow of fluid under pressure from said chamber through said other conduit means.

3. In a fluid pressure brake, in combination, valve means operable to establish a communication for supplying fluid under pressure to effect an application of brakes, a valve device comprising a casing having a chamber, a valve seat in said casing, a slide valve in said chamber mounted on said seat, said communication opening to said seat and traversing said slide valve whereby said slide valve is adapted to be subjected on its seating face to pressure of fluid in said communication, conduit means connected to said chamber for conveying fluid under pressure thereto to act on said slide valve to press it against its seat, check valve means in said conduit means for preventing flow of fluid under pressure therethrough from said chamber, said communication being also open to said chamber for conveying to said chamber fluid under pressure supplied by said valve means, and check valve means arranged to prevent flow of fluid under pressure from said chamber to said communication.

4. In a fluid pressure brake, in combination, brake application means operable by fluid under pressure to effect an application of brakes, valve means operable to supply fluid under pressure to said brake application means, valve means comprising a valve seat and a slide valve cooperative with said seat for establishing communication through which fluid under pressure is adapted to be supplied to said brake application means by operation of said valve means, said slide valve being subject on its seating face to pressure of fluid in said communication and being subject in a chamber to pressure of fluid acting on its opposite face for holding it against said seat, a source of fluid under pressure, conduit means for conveying fluid under pressure from said source to said chamber, check valve means for preventing reverse flow of fluid under pressure through said conduit means, other conduit means for also conveying fluid under pressure to said chamber and other check valve means for preventing reverse flow of fluid under pressure from said chamber through said other conduit means.

5. In a fluid pressure brake, in combination, brake application means operable by fluid under pressure to effect an application of brakes, valve means operable to supply fluid under pressure to said brake application means, valve means comprising a valve seat and a slide valve cooperative with said seat for establishing communication through which fluid under pressure is adapted to be supplied to said brake application means by operation of said valve means, said slide valve being subject on its seating face to pressure of fluid in said communication and being subject in a chamber to pressure of fluid acting on its opposite face for holding it against said seat, a source of fluid under pressure, conduit means for conveying fluid under pressure from said source to said chamber, check valve means for preventing reverse flow of fluid under pressure through said conduit means, means connecting said communication to said chamber for conveying fluid under pressure to said chamber, and check valve means for preventing reverse flow of fluid under pressure from said chamber to said communication.

6. In a locomotive fluid pressure brake equipment, in combination, a brake pipe, a source of fluid under pressure, a distributing valve device comprising an application portion operable by fluid under pressure to effect an application of brakes, a pressure chamber, an equalizing portion operable upon a reduction in pressure in said brake pipe to establish a communication for supplying fluid under pressure from said pressure chamber to said application portion, a delay valve device comprising a slide valve contained in a chamber and cooperative with a valve seat to control said communication and subject on its seating face to pressure of fluid in said communication, conduit means for conveying fluid under pressure from said source to said chamber to act on said slide valve to hold it seated, other conduit means for conveying fluid under pressure from said communication to said chamber, and check valve means associated with each of said conduit means for preventing flow of fluid under pressure from said chamber through the respective conduit means.

7. In a locomotive fluid pressure brake equipment, in combination, a brake pipe, a main reservoir, a distributing valve device comprising an application portion operable by fluid under pressure to supply fluid under pressure from said main reservoir to effect an application of brakes, a pressure chamber, an equalizing portion operable upon a reduction in pressure of fluid in said brake pipe to establish a communication for supplying fluid under pressure from said pressure chamber to said application portion, a delay valve device comprising a slide valve contained in a chamber and cooperative with a seat to control said communication and subject on its seating face to pressure of fluid in said communication, conduit means connecting said main reservoir to said chamber for conveying fluid under pressure to said chamber to act on said slide valve to hold it seated, other conduit means for conveying fluid under pressure from said communication to said chamber, and check valve means associated with each of said conduit means for preventing flow of fluid under pressure from said chamber through the respective conduit means.

ELLIS E. HEWITT.